(12) United States Patent
Jamadagni et al.

(10) Patent No.: US 10,200,928 B2
(45) Date of Patent: Feb. 5, 2019

(54) SYSTEM AND METHOD FOR PROVIDING SEAMLESS SERVICE IN A MOBILE DEVICE

(71) Applicant: Reliance Jio Infocomm Limited, Mumbai (IN)

(72) Inventors: Satish Nanjunda Swamy Jamadagni, Bengaluru (IN); Quazi Humanyun Kabir, Bangalore (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 15/540,144

(22) PCT Filed: Dec. 19, 2015

(86) PCT No.: PCT/IB2015/059803
§ 371 (c)(1),
(2) Date: Jun. 27, 2017

(87) PCT Pub. No.: WO2016/108136
PCT Pub. Date: Jul. 7, 2016

(65) Prior Publication Data
US 2018/0007602 A1    Jan. 4, 2018

(30) Foreign Application Priority Data

Dec. 31, 2014    (IN) .......................... 4258/MUM/2014

(51) Int. Cl.
| | |
|---|---|
| *H04W 36/18* | (2009.01) |
| *H04W 4/06* | (2009.01) |
| *H04W 8/18* | (2009.01) |
| *H04W 28/06* | (2009.01) |
| *H04W 36/14* | (2009.01) |
| *H04W 36/36* | (2009.01) |
| *H04W 88/06* | (2009.01) |

(52) U.S. Cl.
CPC ............. *H04W 36/18* (2013.01); *H04W 4/06* (2013.01); *H04W 8/183* (2013.01); *H04W 28/06* (2013.01);
(Continued)

(58) Field of Classification Search
CPC ..... H04W 36/18; H04W 36/14; H04W 36/34; H04W 36/36; H04W 4/06; H04W 28/06;
(Continued)

(56) References Cited

U.S. PATENT DOCUMENTS 9,131,429 B1 * 9/2015 Bharadwaj .............. H04W 4/90
9,137,026 B1    9/2015 Sun et al.
(Continued)

OTHER PUBLICATIONS

International Search Report for PCT/IB2015/059803 dated Mar. 4, 2016.
(Continued)

*Primary Examiner* — Meless N Zewdu
(74) *Attorney, Agent, or Firm* — Ladas & Parry, LLP (57) ABSTRACT

The present disclosure relates to a system and method for providing seamless service to a dual SIM enabled user equipment. The seamless service is provided by smoothening the broadcast services which is based on the dual SIM mobile devices with a single radio frequency chain that will require tune-away from one a one type of radio service to another type of radio service when checking for possible incoming calls. Due to the tune away user experience service lag in terms of lag in the video playback which is estimated by the present system and method to perform an appropriate smoothing operation for a disruption free user experience in ailing service.

12 Claims, 6 Drawing Sheets

(52) U.S. Cl.
CPC ........... *H04W 36/14* (2013.01); *H04W 36/36* (2013.01); *H04W 8/18* (2013.01); *H04W 88/06* (2013.01)

(58) Field of Classification Search
CPC ....... H04W 8/18; H04W 88/06; H04W 4/003; H04W 8/183; H04W 4/02; H04W 48/18; H04W 48/20; H04W 36/00; H04W 36/0094; H04W 36/0066; H04W 36/0027; H04W 36/24
See application file for complete search history.

(56) References Cited

U.S. PATENT DOCUMENTS

| | | | | |
|---|---|---|---|---|
| 2004/0218533 | A1* | 11/2004 | Kim | H04L 1/0002 370/235 |
| 2007/0099619 | A1* | 5/2007 | Parekh | H04W 36/18 455/439 |
| 2011/0122812 | A1 | 5/2011 | Jeong et al. | |
| 2013/0023275 | A1* | 1/2013 | Mutya | H04W 88/06 455/452.1 |
| 2013/0172023 | A1* | 7/2013 | Chan | H04W 4/14 455/466 |
| 2014/0080479 | A1* | 3/2014 | Vangala | H04W 76/028 455/424 |
| 2014/0120925 | A1* | 5/2014 | Kanthala | H04W 72/04 455/450 |
| 2016/0126996 | A1* | 5/2016 | Jeong | H04W 60/005 455/558 |

OTHER PUBLICATIONS

Written Opinion of the International Search Authority PCT/IB2015/059803 dated Mar. 4, 2016.

* cited by examiner

SYSTEM AND METHOD FOR PROVIDING SEAMLESS SERVICE IN A MOBILE DEVICE

CROSS-REFERENCE TO RELATED APPLICATIONS

This application is the U.S. national phase of PCT Application PCT/IB2015/059803 filed on Dec. 19, 2015, which claims the priority of the Indian patent application No. 4258/MUM/2014 filed on Dec. 31, 2014, which are incorporated herein by reference in their entireties.

TECHNICAL FIELD

The present disclosure generally relates to communication system. More particularly, the present disclosure relates to the field of enhancing user experience for availing service in a dual SIM enabled device and environment.

BACKGROUND

With the enablement of dual SIM capability in a single mobile phone/device, the dual SIM devices have become popular especially with business users to reduce costs by being able to use two different networks, as well as negating the need for having two or more separate mobile devices. With the deployment of LTE networks in multiple countries, the dual SIM solutions are being looked at to cover two different radio access technologies e.g. LTE and 2G/3G services or two different types of service differently such as voice service on one SIM and data service on another SIM.

In case of a dual SIM environment with single radio frequency (RF) chain, the mobile devices listen to the paging messages on the non-active SIM and tune the radio frequency periodically to the second SIM radio frequency to listen to possible incoming calls. When an active session is on-going in the first SIM and the RF tunes away from a first radio corresponding to a first SIM to a second radio corresponding to a second SIM, the system is unable to ensure a disruption free on-going service or at least to provide minimum perceptible disturbance of the on-going service.

When eMBMS (Evolved Multimedia Broadcast Multicast Services) is being streamed over a WiFi channel, an example being eMBMS session streamed from a MiFi router to an end device like a mobile device, there would be quite a few buffering events due to the data stalls in the wireless channel where there is no service. These data stalls are not accounted for in the video stream play out application for a seamless (disruption free) user experience. The video playout application is unable to anticipate possible buffering events and adapt to those scenarios by either slowing down the playing of video frames or by applying any smoothing techniques.

This disclosure addresses the aforesaid problems of service disruption in a dual SIM wireless mobile device when the radio tunes away from the first radio to listen to the second radio for incoming calls. This solution addresses the issue of eMBMS service disruption in dual SIM mobile devices and also addresses the issue of intermittent data lag due to the nature of the wireless channel like on Wi-Fi where the issue of buffering occurs due to the rendering of data stalls.

This present solution in this disclosure also addresses the issue of temporary or intermittent data stalls over wireless channels like the WiFi channels. These data stalls are accounted for in the video stream play out application else the user experience will not be smooth. The present disclosure covers mechanisms to identify data stalls and appropriately trigger possible video smoothing techniques.

SUMMARY

The present disclosure provides a solution to service disruption in a dual SIM wireless device when the radio tunes away from the first radio to listen to the second radio for incoming calls.

The present disclosure also provides a solution to the issue of eMBMS service disruption in dual SIM phones/devices and also addresses the issue of intermittent data lag.

The present disclosure further relates to means and methods for providing seamless user experience without any deterrence without much of user involvement or annoyance.

The present disclosure further provides an efficient end-to-end IP architecture that enables a unicast and broadcast service with high capacity, high bandwidth and high scalability.

The present disclosure further provides the commercial LTE networks and handsets an offer of greater economies of scale as terminals and infrastructure that support these technologies are spreading rapidly.

The present disclosure further relates to boosting eMBMS delivery performance when compared to other technologies by providing seamless experience.

The present disclosure further relates to delivering live, prerecorded and pre-published content, especially for multicasting content during off-peak hours in a smooth manner.

In particular, the present disclosure discloses a system and method for providing seamless service in a dual subscriber identity module (SIM) environment.

The system as disclosed in the present disclosure comprises a user equipment for availing a first service from a network entity; a triggering unit (TU) for detecting a second service available for the user equipment; and one of a service provider module, the network module and combination thereof for providing the seamless service, based on the at least one parameter. Wherein, the first service is provided through a first SIM configured to operate using a first radio access technology (RAT); the triggering unit (TU) triggers a tune-away procedure for tuning away from the first service to a second service in response to the detected second service; the second service is provided through a second SIM configured to operate using a second radio access technology (RAT); the triggering unit (TU) generates at least one parameter associated with said tune-away procedure; and the at least one parameter is one of an instantaneously generated parameter, a pre-recorded parameter and combination thereof;

The method as disclosed in the present disclosure comprising steps of availing a first service from a network entity by a user equipment; detecting a second service available for the user equipment by a triggering unit (TU); triggering a tune-away procedure by the TU for tuning away from the first service to the second service; generating at least one parameter associated with said tune-away procedure by the triggering unit (TU); updating one of a service provider module, the network entity and a combination thereof, with the at least one parameter; and providing seamless service based on the at least one updated parameter by one of the service provider module, the network entity and a combination thereof. Wherein, the first service is provided through a first SIM configured to operate using a first radio access technology (RAT); the second service is provided through a second SIM configured to operate using a second radio access technology (RAT); and the at least one parameter is one of an instantaneously generated parameter, a pre-recorded parameter and combination thereof.

BRIEF DESCRIPTION OF THE DRAWINGS

FIG. 1b illustrates an exemplary system architecture for providing seamless service in a dual subscriber identity module (SIM) environment.

FIG. 1c illustrates an exemplary system diagram for providing seamless service in a dual subscriber identity module (SIM) environment.

FIG. 2 illustrates a simplified system diagram for providing seamless service in a dual subscriber identity module (SIM) environment.

FIG. 3 illustrates a frame correction scheme by one of service provider module, network entity and combination thereof.

FIG. 4 illustrates a method of providing seamless service in a dual subscriber identity module (SIM) environment.

DETAILED DESCRIPTION OF EXEMPLARY EMBODIMENTS

In the following description, for the purposes of explanation, various specific details are set forth in order to provide a thorough understanding of the present disclosure. It will be apparent, however, that the present disclosure may be practiced without these specific details. Several features described hereafter can each be used independently of one another or with any combination of other features. However, any individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

The present disclosure discloses a system and method of providing seamless service in a dual subscriber identity module (SIM) environment. The system comprises a user equipment, a network entity, a triggering unit (TU), and a service provider module. Wherein, the seamless service is provided by one of the network entity and the service provider module based on at least one parameter and instruction received from the triggering unit.

Further, the present disclosure discloses a method that is capable of handling data stalls at the device level as well as at the network level. At the device level, the data stalls are generally handled by the Middleware (MW)/video streaming application level herein after referred to as service provider module, which is responsible for play-rate of a video stream. As disclosed herein, the play-rate of a video steam is the frame per second (FPS) in which one video is played. Further, at the network level, the data stalls are handled by manipulating the downlink data rate. As disclosed herein, the downlink data rate is the rate at which the network entity sends data in form of packets wherein more data rate means delivery of more packets from the network entity to the user terminal. Wherein, the prediction of suitable manipulation requirement is achieved due to usual data stall characteristics of the dual SIM environment and the usual buffering and data stalls characteristics of the wireless channel environment. Wherein, the data stalls are usually predictable for both the dual SIM environment and the wireless channel environment.

The present disclosure encompasses indicating the periodicity information related to the tune away between the two SIM in which two different radio service is enabled. The tune away information is indicated to the service provider module as an indication to apply any video play out smoothing factors. The smoothing is done by manipulating the play rate of video playback. Further, the present disclosure encompasses the service provider module predicting the data stalls primarily due to wireless channel characteristics and initiate an appropriate smoothing function.

The present disclosure encompasses, the triggering unit being responsible for deciding on when to tune away from the first radio frequency to the second radio frequency in order to listen to any possible incoming calls. The triggering unit receives paging information from the network entity whenever an incoming second service is detected. Accordingly, the triggering unit indicates the periodicity information and the time duration of the tune away from the primary frequency where the second service is being received, wherein the second service is a broadcast service such as eMBMS (Evolved Multimedia Broadcast Multicast Services) service or a unicast service. The eMBM Shaving an eMBMS service Layer is modified to increase buffering duration before starting playback. Thus, the service Layer gets enough time to recover segments in error via unicast file repair, but increases start-up and channel change latency. The present disclosure encompasses indication being received from a MiFi router providing eMBMS service to a mobile device. Wherein, mobile device is capable of buffering and replaying data at a lower speed to accommodate a smooth user experience for the duration of tune away. Further, the present disclosure encompasses indication being received from a MiFi router providing eMBMS service to a network entity wherein the network entity streams data at a much higher data rate so that the mobile device can store sufficient data for play out during tune away. When the network entity receives such an indication from the MiFi router, the network entity packs more data per spectral unit and streams the same to mobile devices. The network entity can increase the data density to all devices receiving eMBMS streams or when the video stream is a unicast and the increase in data density in the video stream can be targeted at that individual device. Further, the network entity autonomously increases the data density based on the paging cycle of the devices in a heterogeneous network deployment. Wherein, the heterogeneous network deployment covers but not limited to coexisting 2G, 3G and 4G networks.

Further, with regard to the changes in GSM idle mode timeline, a combination of the above will be needed. The Dual SIM Dual Active (DSDA) devices requires proper prioritization of data bearer to meet Quality of Standard (QoS) as the data bearer is no longer treated as best-effort, e.g. when performing arbitration over the two simultaneous transmissions to ensure RF coexistence. When the tune away indication is sent from the MiFi router to the mobile device with the information of the tune away schedule (from the first radio to the second radio), the mobile device has a prior context of the phase during which the first radio stops listing to the paging message. In this way the mobile device creates its own schedule repair mechanism in line with the tune away schedule of the modem. If the tune away schedule changes in the Mifi router, the MiFi router should update the mobile device with the latest updated tune away schedule.

Figure 1A:
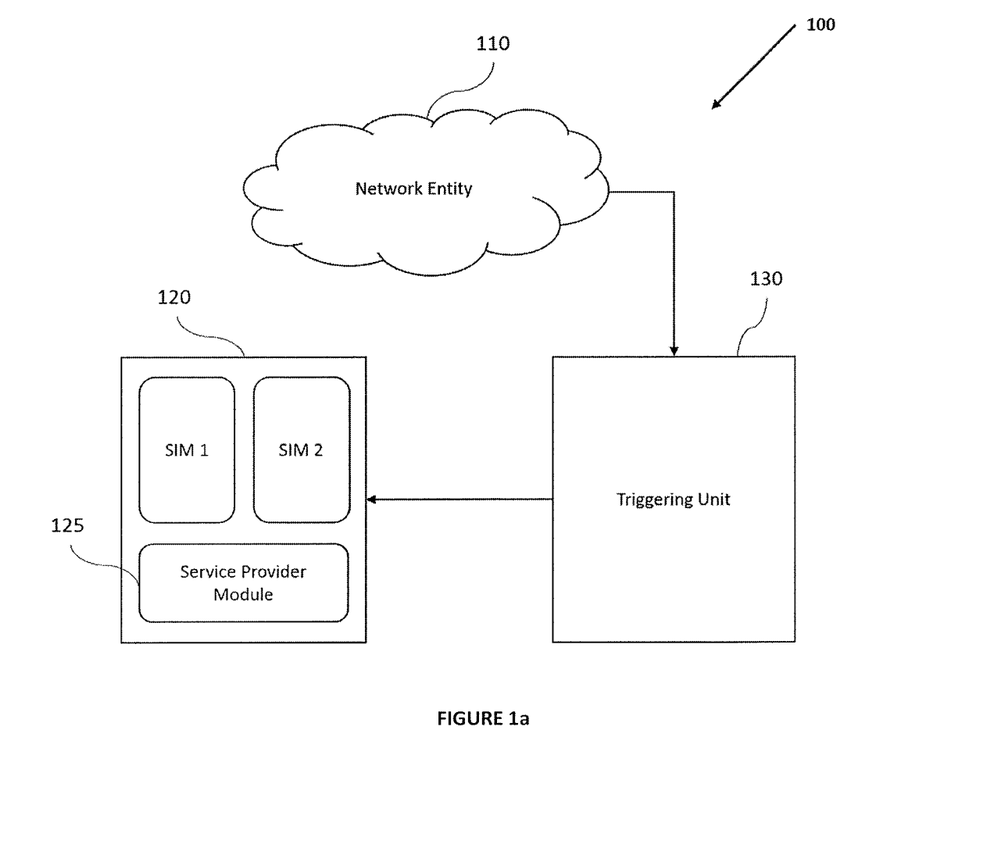
FIG. 1a illustrates an exemplary system architecture for providing seamless service in a dual subscriber identity module (SIM) environment.

As illustrated in FIG. 1a and FIG. 1b, system 100 for providing seamless service in a dual subscriber identity module (SIM) environment, the system comprises a user equipment (UE) 120; a network entity 110; a triggering unit (TU) 130; and a service provider module 125. As used herein, the user equipment is a dual SIM enabled device capable of receiving two different type of radio frequencies/ services such as mobile handset, tablet or any personal digital assistance (PDA), wherein, a first service is provided through a first SIM configured to operate using a first radio access technology (RAT) to the UE.

As used herein, the triggering unit is capable of detecting a second service available for the user equipment, wherein, the triggering unit (TU) triggers a tune-away procedure for tuning away from the first service to a second service in response to the detected second service, wherein, the second service is provided through a second SIM configured to operate using a second radio access technology (RAT).

Further, the triggering unit (TU) generates at least one parameter associated with said tune-away procedure. The triggering may reside separately or within the user equipment and is capable of functioning independently. The parameter generated are but not limited to periodicity information, time duration of the tune-away procedure, data stalls information, periodicity of the data stalls, and buffer status parameter. Wherein, the parameter used is one of an instantaneously generated parameter, a pre-recorded parameter and combination thereof.

As used herein, the one of a service provider module, the network module and combination thereof provides seamless service, based on the at least one parameter, wherein, the service provider module provides seamless service by slowing down the playback of the video based on instruction received through AT commands consisting parameters from the triggering unit.

As used herein, the triggering unit is capable of storing data such as generated parameter. The storage unit used herein is from a variety of data storages such as non-volatile media and/or volatile media. The non-volatile media may include, for e.g., optical disks, magnetic disks, or solid-state drives, such as storage device volatile media may include dynamic memory, such as main memory common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

As used herein, the parameters stored are the storage is either used instantly i.e. using the parameter instantly at the time of generation of the parameter. On the other hand, pre stored parameters as used herein are the parameters that are generated and stored in the storage which are used for future reference and use. Further, the storage unit is either updated with the latest generated parameter or recoded every time with a stamp such as time stamp for future use and reference.

In a preferred embodiment as illustrated in FIG. 1c, the present disclosure encompasses a system 100 having a dual SIM enabled user equipment (e.g., a mobile phone/tablet) 120 which is receiving eMBMS service through a MiFi device 130. As illustrated herein, the MiFi device 130 has a modem layer which performs a dual SIM tune-away logic to generate suitable instruction for performing a seamless function for better user experience in availing eMBMS service, wherein the instruction set in form of packets of data are encapsulated at an encapsulation layer. The encapsulated data packets carrying the instruction set for performing suitable seamless operation are added with a unicast IP header along with information of the port number where the instruction data needs to be delivered and transmitted through a WiFi driver module.

At the phone/tablet end, the data transmitted from the MiFi device 130 is received at the user equipment 120 through an inbuilt WiFi driver module are de-capsulated. Post decapsulating the received data at the phone/tablet terminal, the header from the received data is also removed and forwarded to a middle ware layer which reads the instruction data and instructs an application layer for play and exhibition of the eMBMS service after applying instructed seamless function.

As illustrated in FIG. 2, the present disclosure encompasses a system 140 having a LTE dual SIM enabled phone which is configured with a modem functionality for detecting the tune-away behaviour in a dual SIM environment, wherein eMBMS service is switched from one SIM to another. The modem having capability of detecting the tune-away procedure generates parameter associated to the tune-away procedure. The parameter is forwarded to a middle ware entity in form of command. The phone is further configured with a DASH player for decoding the command sent from the modem for performing a smoothing function for an uninterrupted eMBMS user experience.

As illustrated in the FIG. 3, the T1 indicates the time interval when the radio is listening to the paging of SIM1 which is equal to the time interval when mobile device is in normal eMBMS session; T2 indicates the time interval when the radio is listening to the paging of SIM2 which is equal to the time interval when second service (eMBMS session) is in modified or repair mode; and T3 indicates the time interval before which the eMBMS mobile device starts preparing for the modified eMBMS session.

Further, the mobile device is capable of facing data stalls due to the nature of the wireless channel. Wherein, the wireless channel is a WiFi channel. When the mobile device faces such data stalls, the mobile device with the help of MiFi router predicts the periodicity of such stalls and appropriately apply any video smoothing function.

The present disclosure further encompasses, the tune away indication being seen as a modified AT command between the MiFi router and the mobile device. Further, the tuneaway indication is a message containing the periodicity of the tuneaway and the time duration. The tuneaway indication can also indicate possible data stalls due to the nature of the wireless channel. The tuneaway indication can contain any combination of the tune away duration, the periodicity of the tune away, and any modem layer 2 indications indicating just the nature of the wireless data in terms of the bit error rates or frame error rates. The mobile device uses the bit error rates and the frame error rates provided by the MiFi router to appropriately adjust the smoothing mechanism to be used.

FIG. 4 illustrates the method of providing seamless service in a dual subscriber identity module (SIM) environment. The method 200 initiates at step 210.

At step 220, a first service is availed by the user equipment. Wherein, the service is received from a network entity. Wherein, the first service is provided through a first SIM configured to operate using a first radio access technology (RAT).

At step 230, a second service available for the user equipment is detected by a triggering unit (TU). Wherein, the second service is provided through a second SIM configured to operate using a second radio access technology (RAT). In case no second service is detected, the method flows back to the step 230 or the method flows to step 240.

At step 240, a tune-away procedure is triggered by the TU for tuning away from the first service to the second service.

At step 250, at least one parameter associated with said tune-away procedure is generated by the triggering unit (TU). Wherein, the at least one parameter is one of an instantaneously generated parameter, a pre-recorded parameter and combination thereof.

At step 260, one of a service provider module, the network entity and a combination thereof is updated with the at least one parameter.

At step 270, the seamless service based on the at least one updated parameter is provided by one of the service provider module, the network entity and a combination thereof.

Further, the method 200 encompasses sending the parameters generated at step 250 wherein, the parameters are either instantly generated parameters or pre-generated parameters which are stored in a storage unit and either updated with the latest generated parameter or recording every generated parameters with stamp such as time stamp.

The instant process provides for enhanced use experience due to imparting of seamless service capability in a dual SIM enabled user equipment. The smoothening procedures covered herein are efficient as compared to the existing technologies basis being adaptive and dynamic in nature and depending upon key parameters of the tune-away procedure itself.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

We claim:

1. A method of providing seamless service in a dual subscriber identity module (SIM) environment, the method comprising steps of:
    availing a first service from a network entity by a user equipment via a mobile WiFi (MiFi) device, wherein the first service is provided through a first SIM configured to operate using a first radio access technology (RAT);
    detecting a second service available for the user equipment by the MiFi device, wherein the second service is provided through a second SIM configured to operate using a second radio access technology (RAT);
    triggering, by the MiFi device, a tune-away procedure for a tune-away event pursuant to the detection of the second service;
    generating, by the MiFi device, at least one parameter for said tune-away event, wherein
        the at least one parameter is indicative of an action required for the tune-away event, and
        the at least one parameter is an instantaneously generated parameter, a pre-recorded parameter or a combination thereof;
    updating a service provider module, the network entity or a combination thereof, with the at least one parameter for performing said action during said tune-away event; and
    providing the seamless service based on the at least one parameter by the service provider module, the network entity or a combination thereof.

2. The method as claimed in claim 1, further comprising storing the at least one parameter at a storage unit.

3. The method as claimed in claim 1, wherein the at least one parameter comprises periodicity information, time duration of the tune-away procedure, data stalls information, periodicity of the data stalls, buffer status parameter or a combination thereof.

4. The method as claimed in claim 1, wherein the at least one parameter comprises an indication, for the service provider module, to buffer and replay the first service at a lower speed, thereby handling a data stall during the tune-away event.

5. The method as claimed in claim 1, wherein the at least one parameter comprises an indication, for the network entity, to stream the first service at a higher speed, thereby handling said data stall during the tune-away event.

6. The method as claimed in claim 1, wherein said action includes increasing, by the network entity, a data transmission rate of the first service.

7. The method as claimed in claim 6, wherein the increasing of the data transmission rate is achieved by increasing the data density in all user equipment for a unicast and a broadcast service.

8. The method as claimed in claim 6, wherein a modification of the buffering and a replaying speed is achieved by utilizing bit error rate (BER) and frame error rate (FER) related to the first service.

9. The method as claimed in claim 6, wherein the increasing of the data transmission rate is achieved by packing more data per spectral unit for one of a unicast service and a multicast service.

10. The method as in claim 1, wherein said action includes modifying, by the service provider module, a buffering and a replaying speed of the first service at the user equipment.

11. A system for providing a seamless service in a dual subscriber identity module (SIM) environment, the system comprises:
    a user equipment for availing a first service from a network entity via a mobile WiFi (MiFi) device, wherein the first service is provided through a first SIM configured to operate using a first radio access technology (RAT);
    the MiFi device for detecting a second service available for the user equipment, wherein
        the MiFi device triggers a tune-away procedure for a tune-away event pursuant to detection of the second service;
        the second service is provided through a second SIM configured to operate using a second radio access technology (RAT);
        the MiFi device generates at least one parameter associated for said tune-away event;
        the at least one parameter is indicative of an action required for the tune-away event;
        the at least one parameter is an instantaneously generated parameter, a pre-recorded parameter and combination thereof; or
    a service provider module, the network entity or combination thereof configured to:
        receive the at least one parameter for performing said action during said tune-away event, and
        provide the seamless service by performing said action based on the at least one parameter.

12. The system as claimed in claim 11, wherein the user equipment, the network entity, the MiFi device, and the service provider module are connected through various combination of wired and wireless means.

* * * * *